US010358882B2

(12) United States Patent
Bergonzoni et al.

(10) Patent No.: US 10,358,882 B2
(45) Date of Patent: Jul. 23, 2019

(54) CONTINUOUS VACUUM TRANSPORT SYSTEM AND METHOD (71) Applicant: Mantovani & Vicentini S.R.L., Berra Ferrara (IT)

(72) Inventors: Marco Bergonzoni, Berra Ferrara (IT); Leonardo Renzo Vicentini, Berra Ferrara (IT)

(73) Assignee: Mantovani & Vicentini S.R.L, Berra Ferrara (IT)

(*) Notice: Subject to any disclaimer, the term of this patent is extended or adjusted under 35 U.S.C. 154(b) by 0 days.

(21) Appl. No.: 15/038,960

(22) PCT Filed: Nov. 26, 2014

(86) PCT No.: PCT/US2014/067554
§ 371 (c)(1),
(2) Date: May 24, 2016

(87) PCT Pub. No.: WO2015/081162
PCT Pub. Date: Jun. 4, 2015

(65) Prior Publication Data
US 2017/0022770 A1    Jan. 26, 2017

Related U.S. Application Data (60) Provisional application No. 61/909,170, filed on Nov. 26, 2013.

(51) Int. Cl.
*E21B 21/06* (2006.01)
*E21B 43/34* (2006.01)
*B65G 53/24* (2006.01)

(52) U.S. Cl.
CPC ............ *E21B 21/065* (2013.01); *B65G 53/24* (2013.01); *E21B 21/06* (2013.01); *E21B 43/34* (2013.01)

(58) Field of Classification Search
CPC ........ E21B 21/065; E21B 21/06; E21B 43/34; B65G 53/24
(Continued)

(56) References Cited

U.S. PATENT DOCUMENTS 4,085,975 A * 4/1978 Bilkvist ................. B65G 53/28
                                                            406/109
4,695,205 A * 9/1987 Levine ................... B65G 53/28
                                                            406/106
(Continued)

FOREIGN PATENT DOCUMENTS

EP            1805390 B1    9/2013

OTHER PUBLICATIONS

International Search Report and Written Opinion for the equivalent International patent application PCT/US2014/067554 dated Mar. 31, 2015.
(Continued)

Primary Examiner — Terrell H Matthews
(74) Attorney, Agent, or Firm — Jeffrey D. Frantz (57) ABSTRACT A continuous vacuum transport system and method transport cuttings from a filtration system to a collection location. The filtration system discharges cuttings into a discharge manifold. The cuttings travel though a vacuum conduit into a vacuum hub. A control system controls holding tanks in the vacuum hub to fill one of the holding tanks while emptying one of the holding tanks. The cuttings flow from the vacuum hub through a transport conduit to a discharge end. The discharge end feeds into the connection location.

19 Claims, 6 Drawing Sheets (58) Field of Classification Search
USPC .......................................................... 209/10
See application file for complete search history.

(56) References Cited

U.S. PATENT DOCUMENTS

| | | | | |
|---|---|---|---|---|
| 6,179,071 | B1* | 1/2001 | Dietzen | B63B 27/20 |
| | | | | 175/206 |
| 6,345,672 | B1* | 2/2002 | Dietzen | B63B 27/20 |
| | | | | 175/206 |
| 7,033,124 | B2* | 4/2006 | Snowdon | B63B 27/24 |
| | | | | 414/137.1 |
| 7,195,084 | B2* | 3/2007 | Burnett | B65G 53/10 |
| | | | | 175/206 |
| 7,493,969 | B2* | 2/2009 | Burnett | B63B 27/20 |
| | | | | 175/88 |
| 8,662,170 | B2* | 3/2014 | Eia | B65G 53/06 |
| | | | | 166/267 |
| 9,359,840 | B2* | 6/2016 | Pomerleau | E21B 21/065 |
| 2004/0086360 | A1 | 5/2004 | Snowdon | |
| 2007/0170118 | A1 | 7/2007 | Browne et al. | |
| 2010/0212968 | A1* | 8/2010 | Reddoch, Sr. | E21B 21/066 |
| | | | | 175/217 |
| 2011/0147087 | A1 | 6/2011 | Eia | |
| 2012/0160566 | A1* | 6/2012 | Eia | E21B 21/066 |
| | | | | 175/66 |
| 2013/0092637 | A1 | 4/2013 | Pomerleau | |
| 2015/0367259 | A1* | 12/2015 | Imler | E21B 21/065 |
| | | | | 210/744 |

OTHER PUBLICATIONS

International Preliminary Report on Patentability for the equivalent International patent application PCT/US2014/067554 dated Jun. 9, 2016.
Extended Search Report for the equivalent European patent application 14866176.2 dated Jul. 4, 2017.
Communication pursuant to Article 94(3) for the equivalent European patent application14866176.2 dated Aug. 17, 2018.
Office Action for the equivalent Japanese patent application 2016-535154 dated Nov. 29, 2018.
Communication pursuant to Article 94(3) for the equivalent European patent application 14866176.2 dated Mar. 21, 2019.

* cited by examiner

CONTINUOUS VACUUM TRANSPORT SYSTEM AND METHOD

CROSS-REFERENCE TO RELATED APPLICATIONS

This Application claims priority to Application No. 61/909,170, filed on Nov. 26, 2013, in the United States.

BACKGROUND

Industrial processes produce mixtures of particles and/or fluids that are separated and/or filtered by filtration systems. To reduce waste and cost, one part of the mixture is recaptured and/or recycled. Due to space limitations, other parts of the mixture are stored and/or treated off-site. In one example, a gyratory sifter separates particles above a certain size from the mixture.

In another example, a vibratory shaker separates drill cuttings and drill fluid from a slurry. The drill fluid is recaptured while the drill cuttings are collected. In some locations, such as off-shore oil rigs, space limitations do not allow storage of drill cuttings on-site for extended periods of time. Additionally, cuttings are often contaminated by the drilling fluid. To conform to environmental standards, cuttings are treated before disposal. However, cuttings are treated off-site due to the space limitations of the drilling rig. The drill cuttings are temporarily stored and then removed for processing at a separate treatment facility and/or disposal facility. The drill cuttings are loaded into containers for transport by trucks or ships.

The output of the filtration system may be a distance from the location of the cuttings storage area and/or transportation area. Accordingly, the cuttings are moved from the filtration system to the transportation location using, for example front end loaders. However, in some locales, such as a deep sea rig, front loaders are impractical and/or dangerous.

One or more augers are also used to transport the cuttings to the storage system and/or transportation system. However, operating and/or maintaining the augers is hazardous. The augers have a rotating helical screw blade, known as the flight, that acts as a screw conveyor to move the cuttings through a trough from the filtration system to the storage system and/or transport system. The trough and flight are either covered or protected by fencing and/or railing. In locations with space limitations, the precautions required to safely operate the augers make their use impractical.

DETAILED DESCRIPTION

Embodiments disclosed herein relate to transporting cuttings discharged from a filtration system to a storage area. More specifically, the embodiments disclosed herein relate to a system and a method of transporting cuttings from an industrial filtration system to a storage area using continuous vacuum and/or continuous pressure. Cuttings, as used herein, refer to the residual portion of a mixture that does not pass through the filter media of a filtration system.

Figure 1:
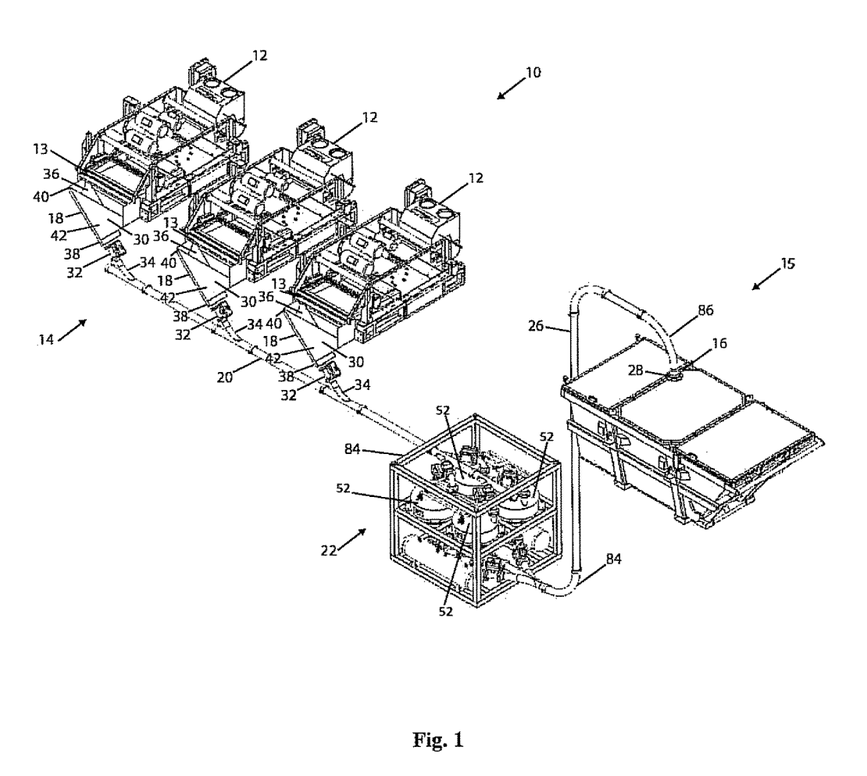
FIG. 1 illustrates an isometric view of an embodiment of a solids control system incorporating a continuous vacuum transport system.

Referring now to the drawings wherein like numerals refer to like parts, FIG. 1 generally illustrates an embodiment of a solids control system 10. The solids control system 10 may be part of a larger system, such as a drilling system for on-shore oil drilling and/or off-shore oil drilling. However, the disclosed embodiments are not limited to on-shore oil drilling and/or off-shore oil drilling. The disclosed embodiment may be used in conjunction with any system requiring cuttings to be transported.

The solids control system 10 may have a filtration system 12, a continuous vacuum transport system 14 and/or a discharge collection system 15. The filtration system 12 may receive a mixture and may separate the mixture into a cuttings portion and a filtrate portion. The filtration system 12 may direct the filtrate portion into a filtrate storage container (17 in FIG. 2), such as a sump, a pan and/or a reservoir. Further, the filtration system 12 may direct the cuttings portion to an outlet 13 of the filtrate system 13. In an embodiment, the filtration system 12 may be a shale shaker. In that embodiment, the filtration system 12 may separate a slurry of drill cuttings and drilling fluid and may output the drill cuttings as the cuttings portion at the outlet 13. In another embodiment, the filtration system 12 may be a gyratory sifter. In that embodiment, the filtration system 12 may separate a mixture of different sized particles. The filtration system 12 may output particles that do not pass through a mesh screen as the cuttings portion. As used herein, the term "cuttings portion" will refer to any particulate matter that does not pass through a filtering element, e.g., screen. In other words the "cuttings portion" will refer to a portion that is not a filtrate portion.

As shown in FIG. 1, the continuous vacuum transport system 14 may have a discharge manifold 18, a vacuum conduit 20, a vacuum hub 22, a control system (24 in FIG. 2), a transport conduit 26 and/or a discharge outlet 28. The discharge manifold 18 is in particulate communication with the outlet 13 of the filtrate system 12. In other words, the discharge manifold 18 may receive the cuttings portion from the filtration system 12. As used herein, the term "in particulate communication with" is used to describe two components such that the cuttings portion is moved from the first component to the second component.

The discharge manifold 18 connects the vacuum conduit 20 to the filtrate system 12. A partial vacuum may be applied to the vacuum conduit 20 so that the cuttings portion is drawn from the discharge manifold 18 though the vacuum conduit 20 into the vacuum hub 22. The cuttings portion may travel through the vacuum hub 22 into the transport conduit 26. Pressure may be applied to the transport conduit 26 and may push the cuttings portion from the vacuum hub 22 through the transport conduit 26 to the discharge outlet 28. The discharge outlet 28 may feed into the discharge collection system 15. The discharge collection system 15 may include a container 16. In other embodiments, the collection system 15 may include a pit, a ship, a cuttings blower, or other collection means known in the art.

The discharge manifold 18 includes a manifold body 30, a manifold valve 32 and a manifold conduit 34. The manifold body 30 may have an opening 36 and an exit 38. Further, the manifold body 30 may have a top 40 and a bottom 42. The opening 36 may be wider than the exit 38 of the manifold body 30. The manifold body 30 may taper from the opening 36 at the top 40 to the exit 38 at the bottom 42. The cuttings portion from the filtration system 12 may be deposited into the opening 36 of the manifold body 30. In an embodiment, the cuttings portion from more than one filtration system 12 may be deposited into the opening 36 of the manifold body 30. The taper of the manifold body 30 may cause the cuttings portion to funnel to the exit 38 of the manifold body 30.

The manifold valve 32 may be connected to the exit 38 of the manifold body 30. The manifold valve 32 may also be connected to the manifold conduit 34. The manifold conduit 34 may connect the manifold valve 32 to the vacuum conduit 20. A vacuum in the vacuum conduit 20 may cause a pressure differential to form at the opening 36 of the manifold body 30. The pressure differential may cause the cuttings portion to pass through the manifold valve 32 and the manifold conduit 34 and may cause the cuttings portion to enter the vacuum conduit 20. The manifold valve 32 may be shut by the control system 24 (FIG. 2) to regulate the movement of the cuttings portion into the vacuum conduit 20.

Figure 2:
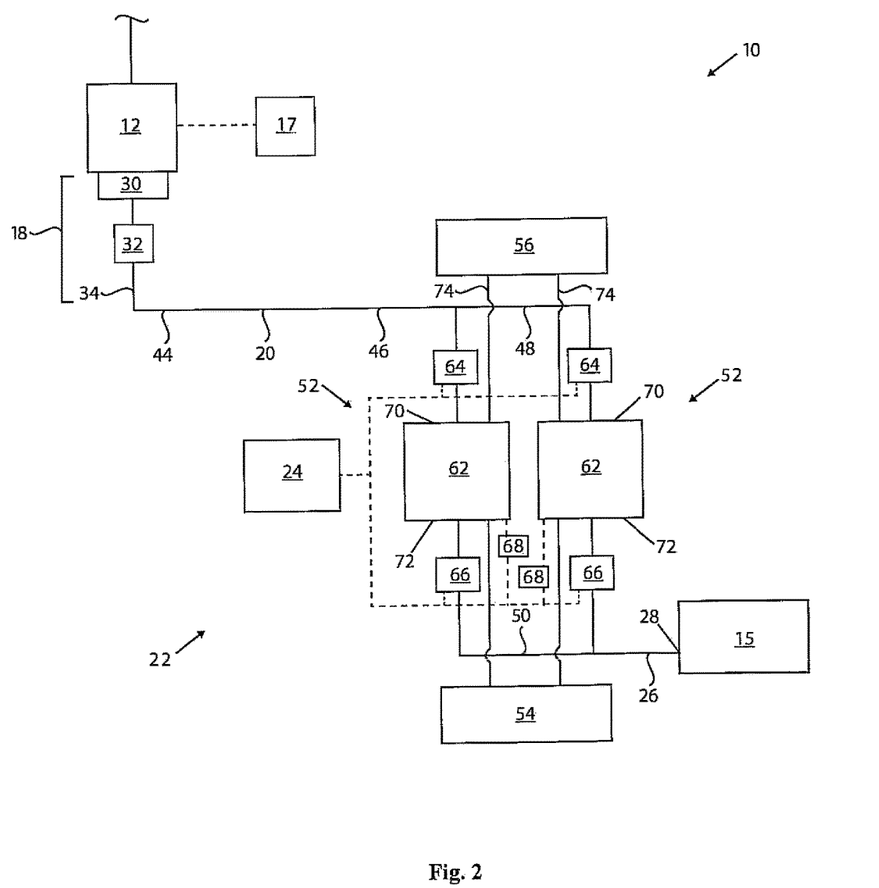
FIG. 2 illustrates a system view of an embodiment of the solids control system incorporating the vacuum cutting transport system.
Figure 3:
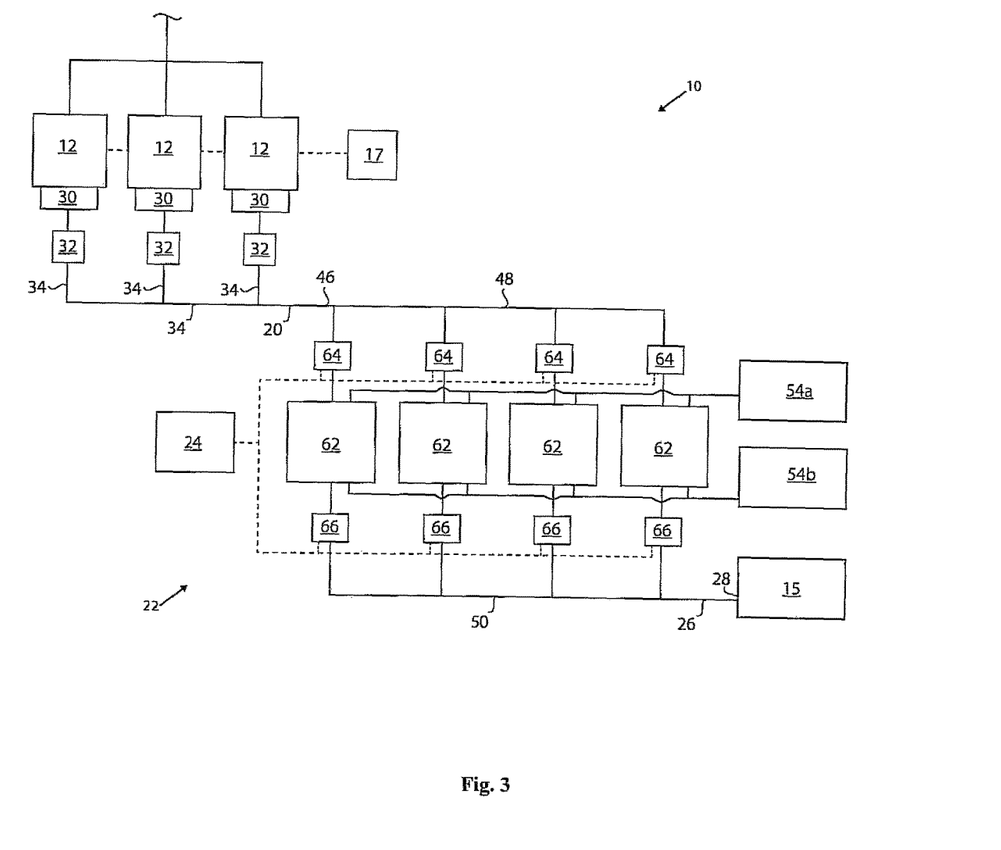
FIG. 3 illustrates a system view of another embodiment of the solids control system incorporating the vacuum cutting transport system.

Referring to FIGS. 1 and 2, a schematic of the solids control system 10 is shown. The vacuum transport system 14 includes a vacuum conduit 20 having a first end 44 and a second end 46. The first end 44 of the vacuum conduit 20 may be connected to the manifold conduit 34 of the discharge manifold 18. In an embodiment, the continuous vacuum transport system 14 may have a plurality of discharge manifolds 18. As shown in FIGS. 1 and 3, a plurality of the filtration systems 12 may be connected to the plurality of the discharge manifolds 18. The plurality of the discharge manifolds 18 may be connected to the first end 44 of the vacuum conduit 20 through the manifold conduit 34 of the discharge manifolds 18. The second end 46 of the vacuum conduit 20 may be connected to the vacuum hub 22.

Figure 4:
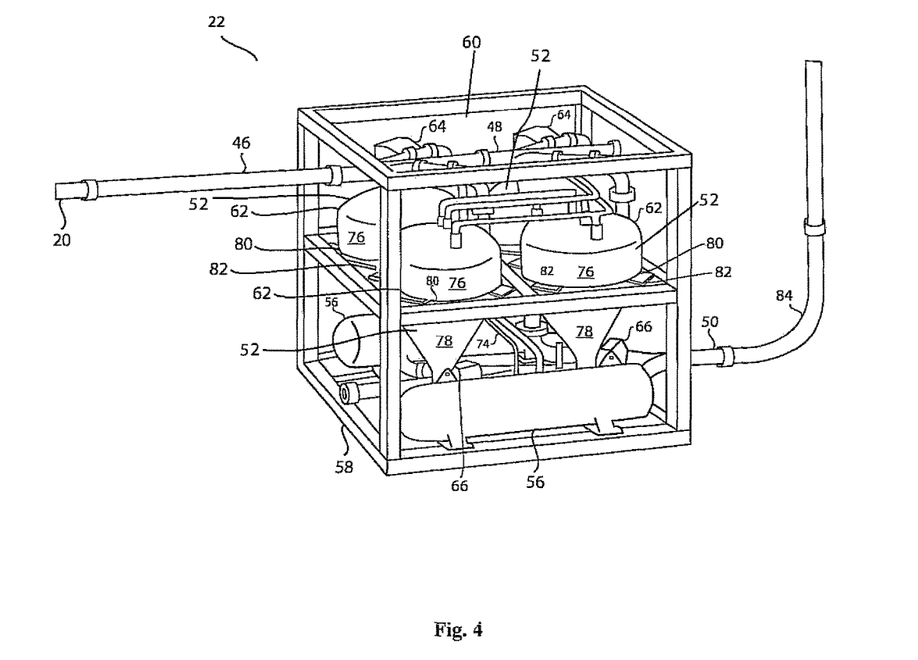
FIG. 4 illustrates an isometric view an embodiment of a vacuum hub of the continuous vacuum transport system.

FIG. 4 shows a detail view of vacuum hub 22. The vacuum hub 22 may have an inlet 48, an outlet 50, a plurality of holding tanks 52 and a vacuum pump 54. The inlet 48 of the vacuum hub 22 may be connected to the second end 46 of the vacuum conduit 20. The inlet 48 may also be connected to holding tanks 52 such that the vacuum conduit 20 is in particulate communication with the holding tanks 52 via the inlet 48. The plurality of holding tanks 52 may be connected to the inlet 48 of the vacuum hub 22 and the outlet 50 of the vacuum hub 22.

The vacuum hub 22 may have a frame 58 that defines an interior portion 60 of the vacuum hub 22. The holding tanks 52 may be located within the interior portion 60 of the frame 58. The frame 58 may be configured to accommodate the holding tanks 52 in different positions. In an embodiment, the holding tanks 52 may be positioned next to each other on a vertical plane. In another embodiment, one or more of the holding tanks 52 may be elevated in the frame 58 relative to the rest of the holding tanks 52. Accordingly, the configuration of the holding tanks 52 within the frame is not intended to limit the scope of the present disclosure.

Referring to FIGS. 2-4, each of the plurality of holding tanks 52 may have a pressure vessel 62, an inlet valve 64, an outlet valve 66 and a level sensor 68. The pressure vessel 62 may have a top 70 and a bottom 72. The inlet valve 64 may be connected to the top 70 of the pressure vessel 62. Furthermore, the inlet valve 64 may be connected to the inlet 48 of the vacuum hub 22. The cuttings portion may travel from the vacuum conduit 20, through the inlet 48 of the vacuum hub 22, through the inlet valve 64 and into the pressure vessel 62 of one of the holding tanks 52. The control system 24 may open and/or shut the inlet valves 64 of one or more of the holding tanks 52 to direct the flow of the cuttings portion. The outlet valve 66 may be connected to the bottom 72 of the pressure vessel 62.

The outlet valve 66 may be connected to the outlet 50 of the vacuum hub 22. The control system 24 may open and/or shut the outlet valves 66 of one or more of the holding tanks 52 to direct the flow of the cuttings portion. The level sensor 68 may detect the level of the cuttings portion in the pressure vessel 62. In an embodiment, the level sensors 68 may communicate to the control system 24 whether the pressure vessels 62 are each empty or full. In another embodiment, the level sensors 68 may communicate a value representing an amount of the cuttings portion in each of the pressure vessels 62.

As shown in FIG. 4, in an embodiment, each of the pressure vessels 62 may have a cylindrical portion 76 and a conical portion 78. The cylindrical portion 76 may be located at the top 70 of the pressure vessel 62, and the conical portion 78 may be located at the bottom 72 of the pressure vessel 62. The cylindrical portion 76 and the conical portion 78 may be joined at a junction point 80. The conical portion 78 may taper until connecting to the outlet valve 66. In an embodiment, the pressure vessel 62 may have a plurality of tabs 82 to connect the pressure vessel 62 to the frame 58 of the vacuum hub 22. In a further embodiment, the plurality of tabs 82 may be spaced substantially equally around the junction point 80 of the pressure vessel 62.

The pressure vessel 62 may be connected to the vacuum pump 54 of each of the holding tanks 52. The vacuum pump 54 may supply a vacuum to the holding tanks 52 when the inlet valve 64 of the holding tank 52 is open and the outlet valve 66 of the holding tank 52 is closed. The vacuum supplied to the holding tank 52 by the vacuum pump 54 creates a pressure differential between the first end 44 of the vacuum conduit 20 and the pressure vessel 62 of the holding tank 52. The cuttings portion may flow into the holding tank 52. The vacuum pump 54 may supply pressure to the top 70 of the pressure vessel 62 when the outlet valve 66 of the holding tank 52 is open and the inlet valve 64 of the holding tank 52 is closed. The pressure may cause the cuttings portion to flow from the holding tank 52 though the outlet valve 66.

As shown in FIG. 3, in another embodiment, the vacuum hub 22 may have a first vacuum pump 54a and a second vacuum pump 54b to cause the cuttings portion to flow in and out of the pressure vessel 62. The first vacuum pump 54a may supply a vacuum to the pressure vessels 62 when the pressure vessels 62 are filling. The second vacuum pump 54b may supply a pressure to the holding tanks 52 when the pressure vessels 62 are emptying.

Referring to FIG. 2, in an embodiment, the vacuum hub 22 may have a pressure tank 56. The pressure tank 56 may be connected to the top 70 of the pressure vessels 62 of each of the holding tanks 52. In an embodiment, a plurality of pressure assist conduits 74 may connect the pressure tank 56 to the top 70 of the pressure vessels 62. The pressure tank 56 may supply pressure to the holding tank 52 to empty the cuttings portion from the holding tank 52. Additionally, as illustrated in FIG. 4, the pressure tank 56 may be located within the interior portion 60 of the frame 58.

Referring to FIGS. 1 and 4, the transport conduit 26 may have a first end 84 and a second end 86. The first end 84 of the transport conduit 26 may be connected to the outlet 50 of the vacuum hub 22. The second end 86 of the transport conduit 26 may be connected to the discharge outlet 28, which is connected to the collection system 15. During emptying one of the holding tanks 52, the vacuum pump 54, through the outlet valve 66 of one of the holding tanks 52, may supply pressure to the first end 84 of the transport conduit 26 to push the cuttings portion from the first end 84 of the transport conduit 26 to the second end 86 of the transport conduit 26.

Referring to FIGS. 1 and 2, the control system 24 may be connected to the manifold valve 32 of the discharge manifold 18. The control system 24 may open and/or close the manifold valve 32 to control the flow of the cuttings portion into the vacuum conduit 20. Additionally, the control system 24 may open and/or may close the manifold valve 32 to control the amount of vacuum pressure that may be used by the continuous vacuum transport system 14 from the vacuum pump 54. The control system 24 may close the manifold valve 32 of the discharge manifold 18 when the filtration system 12 that may be feeding the discharge manifold 18 is offline. The control system 24 may also be connected to the inlet valve 64, the outlet valve 66 and the level sensor 68 of each of the holding tanks 52 of the vacuum hub 22.

To fill one of the holding tanks 52, the control system 24 may open the inlet valve 64 and may close the outlet valve 66 of the holding tank 52. Additionally, to empty one of the holding tanks 52, the control system 24 may close the inlet valve 64 and may open the outlet valve 66 of the holding tank 52. When one of the holding tanks 52 is not being emptied or filled, the control system 24 may close the inlet valve 64 and the outlet valve 66 of the holding tank 52. The control system 24 may determine whether one or more of the holding tanks 52 are full or empty by communicating with the level sensors 68 of the holding tanks 52.

The control system 24 may be a computer system and/or discrete electronic hardware. Additionally, the control system 24 may be autonomous and/or may accept input by a user. In an embodiment, the control system 24 may be located at the vacuum hub 22. In another embodiment, the control system 24 may be located at a central control center. In an embodiment, the control system 24 may be part of a larger system to control the operation of an industrial process, such as a fluids control system in on-shore oil drilling and/or off-shore oil drilling.

In the embodiment shown in FIG. 2, the vacuum hub 22 may have two holding tanks 52. The control system 24 may cause one of the holding tanks 52 to fill while causing the other holding tank 52 to empty. The pressure in the transport conduit 26 and/or vacuum in the vacuum conduit 20 that may be supplied by the vacuum pump 54 may be configured so that the time required to empty one of the holding tanks 52 is less than or equal to the time required to fill the other holding tank 52.

As illustrated in FIG. 3, in another embodiment, the vacuum hub 22 may have three or more holding tanks 52. The control system 24 may fill one of the holding tanks 52 and may empty one of the holding tanks 52. Additionally, the control system 24 may hold one or more of the holding tanks 52 so that the holding tanks 52 are neither filling nor emptying. In this embodiment, the control system 24 may rotate (or change) transportation of the cuttings portion between the holding tanks 52.

Referring collectively to FIGS. 1-4, during operation, the discharge manifold 18 may receive the cuttings portion from the filtration system 12. The vacuum pump 54 may cause a pressure differential between the first end 44 of the vacuum conduit 20 and the second end 46 of the vacuum conduit 20. The cuttings portion may move from the discharge manifold 18 to the second end of the vacuum conduit 20. In an embodiment with the plurality of discharge manifolds 18, the cuttings portion may move from each of the discharge manifolds 18 to the second end 46 of the vacuum conduit 20. The cuttings portion may travel from the second end 46 of the vacuum conduit 20 into the inlet 48 of the vacuum hub 22. The control system 24 may control the inlet valves 64 of the holding tanks 52 to direct the cuttings portion into at least one of the holding tanks 52.

Figure 5:
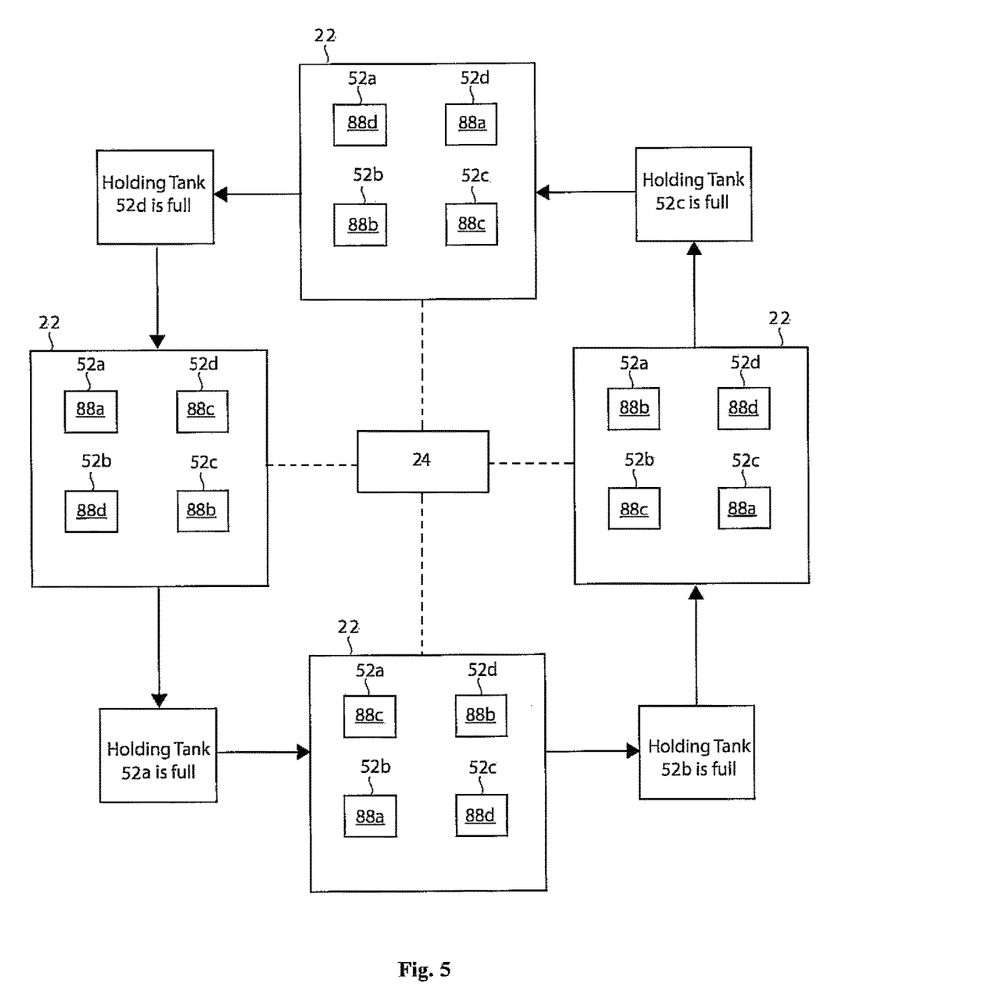
FIG. 5 illustrates a diagram of an embodiment of a control system of the continuous vacuum transport system.

As shown in FIG. 5, the control system 24 may control the holding tanks 52a, 52b, 52c, and 52d so that the cuttings portion is filling at least one of the holding tanks 52a, 52b, 52c, and 52d and the cuttings portion is emptied from at least one of the holding tanks 52a, 52b, 52c, and 52d. The control system 24 may assign one of a plurality of states 88a, 88b, 88c and 88d to each of the holding tanks 52a, 52b, 52c, and 52d. The plurality of states may be defined as a filling state 88a, an emptying state 88b, a full state 88c and an empty state 88d. The control system 24 may manipulate the inlet valve 64 and/or outlet valve 66 of each of the holding tanks 52a, 52b, 52c, and 52d to create the plurality of states 88a, 88b, 88c and 88d. In the filling state 88a, the inlet valve 64 of the holding tank 52 may be open, and the outlet valve 66 of the holding tank 52 may be closed. In the emptying state 88b, the inlet valve 64 of the holding tank 52 may be closed, and the outlet valve 66 of the holding tank 52 may be open. In the full state 88c and the empty state 88d, the inlet valve 64 of the holding tank 52 may be closed, and the outlet valve 66 of the holding tank 52 may be closed.

Referring to FIGS. 2 and 5, the control system 24 may use the level sensors 68 of the holding tanks 52 to determine when the holding tanks 52 in the filling state 88a is full and may then put the holding tank 52 in the full state 88c. When the holding tank 52 transitions from the filling state 88a to the full state 88c, the control system 24 may select one of the holding tanks 52 to transition from the empty state 88d to the filling state 88a.

Additionally, the control system 24 may use the level sensors 68 of the holding tanks 52 to determine when one of the holding tanks 52 in the emptying state 88b is empty and may transition the holding tank 52 into the empty state 88d. When the holding tank 52 transitions to the empty state 88d from the emptying state 88c, the control system 24 may select one of the holding tanks 52 in the full state 88c to transition to the emptying state 88b.

In an embodiment, the vacuum hub 22 may have two holding tanks 52. The holding tanks 52 may transition between the filling state 88a and the emptying state 88b. In an embodiment, the vacuum hub 22 may have more than two of the holding tanks 52. The control system 24 may rotate which of the holding tanks 52 is placed in the filling state 88a and which of the holding tanks 52 is placed in the emptying state 88b. In this embodiment, the holding tanks 52 may transition into the empty state 88d between the emptying state 88b and the filling state 88a.

Figure 6:
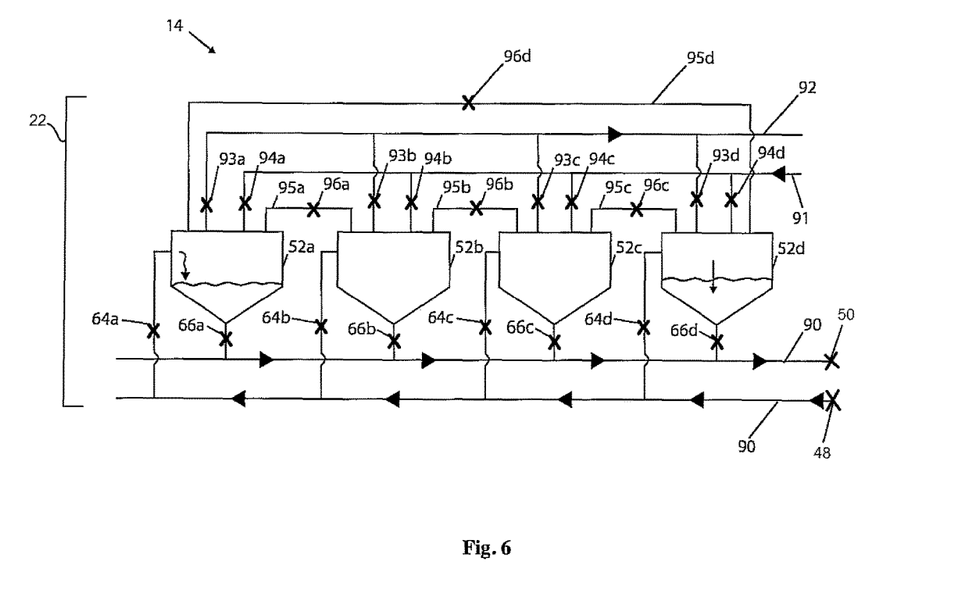
FIG. 6 illustrates a flow diagram of an embodiment of a solids control system incorporating a continuous vacuum transport system.

Referring now to FIG. 6, a flow diagram illustrates an embodiment of the solids control system incorporating a continuous vacuum transport system. FIG. 6 illustrates flows and connectivity between the holding tanks 52a, 52b, 52c, and 52d of the vacuum hub 22. For example, a cuttings portion flow 90 is shown with directional arrows to indicate direction of travel of the cuttings portion. A pressure flow 91 is shown with directional arrows to indicate the application of pressure to the holding tanks 52. Further, a vacuum flow 92 is shown with directional arrows to indicate the application of vacuum to the holding tanks 52. The pressure flow 91 may be controlled and/or directed by valves 94. The valves 94 may be connected in the pressure flow 91 to the holding tanks 52a, 52b, 52c, and 52d. The valves 94 may be controlled by the control system 24. The vacuum flow 92 may be controlled and/or directed by valves 93. The valves 93 may be connected in the vacuum flow 92 to the holding tanks 52a, 52b, 52c, and 52d. The valves 93 may be controlled by the control system 24.

The cuttings portion flow 90 may supply the cuttings portion to the holding tanks 52 of the vacuum hub 22. The valves 64 may be connected in the supply of the cuttings portion flow 90 to the holding tanks 52a, 52b, 52c, and 52d. The valves 64 may be controlled by the control system 24. The valves 66 may be connected at the bottom 72 of the holding tanks 52a, 52b, 52c, and 52d. The valves 66 may be connected in the discharge of the cuttings portion flow 90 from the holding tanks 52a, 52b, 52c, and 52d to the outlet 50 of the vacuum hub 22. For example, as shown in FIG. 6, the directional arrows of the cuttings portion flow 90 indicate travel of the supply of the cuttings portion from right to left. Conversely, the directional arrows of the cuttings portion flow 90 indicate travel of the discharge of the cuttings portion from left to right.

Referring to FIGS. 1 and 6, the cuttings portion may be drawn from the discharge manifold 18 though the vacuum conduit 20 into the vacuum hub 22. The cuttings portion may enter through the inlet 48 of the vacuum hub 22 as shown in FIG. 4. The cuttings portion may travel into one of the holding tanks 52a, 52b, 52c, and 52d of the vacuum hub 22.

FIG. 6 also illustrates air bypass lines 95. The air bypass lines 95 may connect each holding tank 52 to another holding tank 52. In some embodiments, the air bypass lines 95 may connect each holding tank 52 to an adjacent holding tank 52. The air bypass lines 95 may have valves 96. The valves 96 may be controlled by the control system 24. For example, air bypass line 95a may be connected at the top 70 of holding tank 52a and at the top 70 of holding tank 52b to allow air flow between holding tank 52a and holding tank 52b. Also, air bypass line 95b may be connected at the top 70 of holding tank 52b and at the top 70 of holding tank 52c to allow air flow between holding tank 52b and holding tank 52c. Further, air bypass line 95c may be connected at the top 70 of holding tank 52c to the top 70 of holding tank 52d to allow air flow between holding tank 52c and holding tank 52d. Finally, air bypass line 95d may be connected at the top 70 of holding tank 52d to the top 70 of holding tank 52a to allow air flow between holding tank 52d and holding tank 52a. The air bypass lines 95a, 95b, 95c and 95d may have corresponding valves 96a, 96b, 96c and 96d. The valves 96 may be controlled by the control system 24.

The cuttings portion of the cuttings portion flow 90 may begin flowing into holding tank 52a. The supply of the cuttings portion may enter the holding tank 52a when the valve 64a is open and the valve 66a at the bottom 72 of the holding tank 52a is closed. Thus, the cuttings portion may accumulate in the holding tank 52a and may fill the holding tank 52a. To facilitate the cuttings portion flow 90 of the cuttings portion into the holding tank 52a, a vacuum may be applied to the holding tank 52a. For example, the vacuum may be provided by the vacuum flow 92 when the valve 93b and valve 96a in the air bypass line 95a is also open. The vacuum may create suction within the holding tank 52a to draw the cuttings portion into the holding tank 52a as shown.

Referring again to FIG. 6, the holding tank 52d may discharge the cuttings portion through the valve 66d into the discharge of the cuttings portion flow 90. To facilitate the cuttings portion flow 90 of the cuttings portion out of the holding tank 52d, a pressure may be applied to the holding tank 52d. For example, the pressure may be provided by the pressure flow 91 when the valve 94d is open. The pressure may force the cuttings portion out of the holding tank 52d and into the discharge of the cuttings portion flow 90 as shown. Thus, the cuttings portion may move from the holding tank 52d, through the valve 66d to the outlet 50 of the vacuum hub 22.

As shown in FIGS. 5 and 6, the control system 24 may control the holding tanks 52a, 52b, 52c, and 52d so that the cuttings portion is filling one of the holding tanks 52a, 52b, 52c, and 52d and the cuttings portion is emptied from one of the holding tanks 52a, 52b, 52c, and 52d. The control system 24 may rotate which of the holding tanks 52 is placed in the filling state and which of the holding tanks 52 is placed in the emptying state.

FIG. 6 illustrates a particular state of the holding tanks 52. For example, the holding tank 52a may be described as the suction tank. The cuttings portion flow 90 may be entering the holding tank 52a placing the holding tank 52a in the filling state. The holding tank 52b may be described as the ready tank to become the next in succession to be placed in the filling state. The holding tank 52c may be in an empty state. The holding tank 52d may be described as the discharge tank. The cuttings portion flow 90 may be discharging from the holding tank 52d placing the holding tank 52d in the emptying state.

During operation of the control system 24, the vacuum flow 92 may pull air from the holding tank 52b with the valve 96a of the air bypass line 95a open. As a result, the vacuum in the holding tank 52a may be transferred to the holding tank 52b and the cuttings portion may enter the holding tank 52b. This operation may prevent the cutting portion from entering in the vacuum flow 92 which may cause vacuum pump damage.

When the control system 24 may detect that the holding tank 52a may be full (e.g. based on level sensor 68), the process shifts, so that: 1) the discharge tank, the holding tank 52d, may become the empty tank; 2) the empty tank, the holding tank 52c may become the ready tank; 3) the ready tank, the holding tank 52b may become the suction tank; and 4) the suction tank, the holding tank 52a, may become the discharge tank.

Typically, a constraint on the control system 24 may be that the discharging process for a particular holding tank 52 may be completed before the filling process of another holding tank 52 may be initiated. Upon completion of the discharging process of a particular holding tank may be empty, the valve that connects the empty tank to the vacuum flow 92 may open so that the control system 24 may start evacuating the tank and have the tank ready for the process shift. The flow of the cuttings portion from the filtration system 12 through the continuous vacuum transport system 14 to the vacuum hub 22 may be continuous. The vacuum in the manifold and vacuum conduit may be continuously applied.

The cuttings portion may move from one of the holding tanks 52a, 52b, 52c, and 52d to the outlet 50 of the vacuum hub 22. The vacuum pump 54 may provide pressure to transport the discharge from the outlet 50 of the vacuum hub 22 through the transport conduit 26 to the discharge outlet 28. At the discharge outlet 28, the discharge may be collected in a container 16 of collection system 15. In an embodiment, the collection system 15 may include, for example, but not limited to a cuttings blower to transport the discharge further to a container, a pit, or a ship.

A solids control system according to embodiments disclosed herein may include a filtration system that produces a cuttings portion and a filtrate portion, a vacuum transport system, and a collection system connected to the vacuum transport system. The vacuum transport system may include a discharge manifold connected to the filtration system. The discharge manifold may also be connected to a vacuum conduit. The vacuum conduit may be connected to a vacuum hub, which is connected to a transport conduit. The transport conduit may be connected to the collection system.

A method in accordance with embodiments disclosed herein may include separating a mixture into a filtrate portion and a cuttings portion. A partial vacuum may be applied to a vacuum conduit, thereby drawing the cuttings portion into the vacuum conduit. A first holding tank may be filled with the cuttings portion from the vacuum by applying a vacuum to the first holding tank in particulate communication with the vacuum conduit. The first holding tank may be emptied of the cuttings portion to a transport conduit by applying pressure to a top of the holding tank. The cuttings portion may then be directed into a storage vessel.

A vacuum transport system in accordance with embodiments disclosed herein may include a vacuum conduit connected to a vacuum hub. Specifically, an inlet of the vacuum hub may be in particulate communication with the vacuum conduit. The vacuum hub may include a plurality of holding tanks in particulate communication with the inlet of the vacuum hub. An outlet of the vacuum hub may be in particulate communication with the holding tank and a transport conduit.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the present disclosure should be limited only by the attached claims.

What is claimed is:

1. A system comprising:
    a filtration system that produces a cuttings portion and a filtrate portion;
    a vacuum transport system for transporting the cutting portion from the filtration system, the vacuum transport system comprising:
        a discharge manifold connected to an outlet of the filtration system, the discharge manifold having a manifold body with a total height defined between a top side and an opposite bottom side, an opening at the top side and an exit at the bottom side;
        a manifold valve connected to the exit of the manifold body;
        a vacuum conduit connected to the manifold valve, the discharge manifold and manifold valve connecting the vacuum conduit to the filtration system, wherein the manifold valve is configured to be movable to a closed position to regulate movement of the cutting portion into the vacuum conduit;
        a first vacuum hub connected to the vacuum conduit, the first vacuum hub having a frame defining an interior portion of the first vacuum hub, at least one first holding tank provided within the interior portion of the frame of the first vacuum hub and in particulate communication with the vacuum conduit; and
        a transport conduit connected to the first vacuum hub and in particulate communication with the at least one first holding tank; and
    a collection system connected to the transport conduit of the vacuum transport system.

2. The system of claim 1, further comprising a second vacuum hub that comprises:
    an inlet in particulate communication with the vacuum conduit;
    at least one second holding tank in particulate communication with the inlet;
    a vacuum pump operatively coupled to the at least one second holding tank; and
    an outlet in particulate communication with the at least one second holding tank.

3. The system of claim 1, wherein the at least one first holding tank comprises:
    a pressure vessel;
    a pressure vessel inlet valve located at a top of the pressure vessel; and
    a pressure vessel outlet valve located at a bottom of the pressure vessel.

4. The system of claim 1, further comprising a control system operatively coupled to the first vacuum hub.

5. The system of claim 4, further comprising a fill sensor operatively coupled to a pressure vessel of the first vacuum hub.

6. The system of claim 1, wherein the first vacuum hub comprises:
    an inlet connected to the vacuum conduit;
    the at least one first holding tank connected to the inlet and having an inlet valve and an outlet valve;
    a vacuum pump operatively coupled to the at least one first holding tank;
    an outlet in particulate communication with the at least one first holding tank; and
    a control system operatively coupled to the tank inlet valve, the tank outlet valve, and the vacuum pump, wherein the control system is configured to selectively open and close the tank inlet and outlet valves to supply a vacuum.

7. A method comprising:
    separating, via a filtration system, a mixture into a filtrate portion and a cuttings portion;
    receiving, at a discharge manifold, the cuttings portion from an outlet of the filtration system that is in particulate communication with the discharge manifold;
    applying a partial vacuum to a vacuum conduit, thereby drawing the cuttings portion from the discharge manifold into the vacuum conduit,
    connecting a manifold valve to an exit of discharge manifold, wherein the discharge manifold and manifold valve connect the vacuum conduit and the filtration system, wherein the manifold valve is movable to a closed position to regulate movement of the cutting portion into the vacuum conduit;
    providing a frame of a vacuum hub, the frame defining an interior portion of a vacuum hub;
    filling a first holding tank with the cuttings portion from the vacuum conduit by applying a vacuum to the first holding tank in particulate communication with the vacuum conduit;
    emptying the cuttings portion in the first holding tank to a transport conduit by applying pressure, supplied by at least one pressure tank, to a top of the holding tank; and directing the cuttings portion into a storage vessel,
wherein at least one selected from the first holding tank and the at least one pressure tank is provided within the interior portion of the vacuum hub.

8. The method of claim 7, further comprising depositing the cuttings portion into the discharge manifold, wherein the discharge manifold is in particulate communication with the vacuum conduit.

9. The method of claim 7, further comprising opening a valve disposed between the vacuum conduit and the first holding tank to allow the first holding tank to fill.

10. The method of claim 7, further comprising closing a valve disposed between the vacuum conduit and the first holding tank to allow the first holding tank to empty.

11. The method of claim 7, further comprising changing a first state of the first holding tank from at least one of a filling state, a emptying state, a full state, or an empty state, to a second state different from the first state, with a control system operatively coupled to an inlet and outlet valve of the first holding tank.

12. The method of claim 7, further comprising emptying the cuttings portion from the first holding tank when a level sensor signals a control system that the first tank is full.

13. The method of claim 7, further comprising monitoring the first holding tank with a control system.

14. The method of claim 7, further comprising filling the first holding tank while emptying a second holding tank.

15. The method of claim 7, further comprising maintaining a continuous vacuum on the vacuum conduit.

16. The method of claim 7, further comprising:
opening an air bypass valve between the first holding tank and a second holding tank;
transferring the vacuum from the first holding tank to the second holding tank once the first holding tank is full; and
drawing the cuttings portion into the second holding tank, thereby preventing the cuttings portion from entering the vacuum flow.

17. An apparatus comprising:
a vacuum conduit in particulate communication with an outlet of a filtrate system and connected to a discharge manifold via a manifold valve such that the filtrate system and the vacuum conduit are connected via the discharge manifold and the manifold valve, wherein the manifold valve is downstream from an exit of the discharge manifold and is configured to be movable to a closed position to regulate movement a cuttings portion into the vacuum conduit;
a vacuum hub comprising:
a frame defining an interior portion of the vacuum hub;
an inlet of the vacuum hub in particulate communication with the vacuum conduit;
a plurality of holding tanks provided in the interior portion of the vacuum hub and in particulate communication with the inlet of the vacuum hub;
an outlet of the vacuum hub in particulate communication with the holding tank; and
a transport conduit in particulate communication with the outlet of the vacuum hub.

18. The apparatus of claim 17, further comprising an air bypass line disposed between at least a first and second holding tank of the plurality of holding tanks to provide fluid communication between the adjacent holding tanks of the plurality of holding tanks.

19. The apparatus of claim 17, further comprising two vacuum pumps coupled to each holding tank of the plurality of holding tanks, wherein a first vacuum pump provides a vacuum while filling a first holding tank of the plurality of holding tanks and a second vacuum pump provides a vacuum while emptying the first holding tank.

* * * * *